Figure 1:
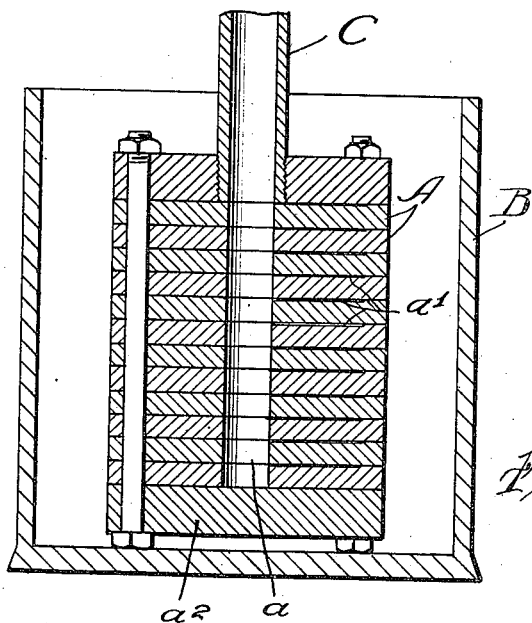

W. A. WEST.
PAINT AND PROCESS OF MAKING SAME.
APPLICATION FILED AUG. 18, 1916.

1,241,067. Patented Sept. 25, 1917.

Witnesses:
O. H. Plumtree
Edna M. MacIntosh

Inventor:
Walter A. West
by Burton & Burton
his Attys.

UNITED STATES PATENT OFFICE.

WALTER A. WEST, OF ELKHORN, WISCONSIN.

PAINT AND PROCESS OF MAKING SAME.

1,241,067. Specification of Letters Patent. Patented Sept. 25, 1917.

Application filed August 18, 1916. Serial No. 115,676.

*To all whom it may concern:*

Be it known that I, WALTER A. WEST, a citizen of the United States, residing at Elkhorn, in the county of Walworth and State of Wisconsin, have invented new and useful Improvements in Paint and Processes of Making Same, of which the following is a specification, reference being had to the accompanying drawings, forming a part thereof.

The purpose of this invention is to provide an improved paint, or a paint oil adapted for making paint by the admixture of proper mineral bodies and pigment, and a process of making the same. It consists in the combination of substances mixed and united in the manner described, and the steps set out, as indicated in the claims.

The drawing shows an apparatus which may be used in one separate process,

Figure 1, being an axial section of said apparatus, and

Figure 2:
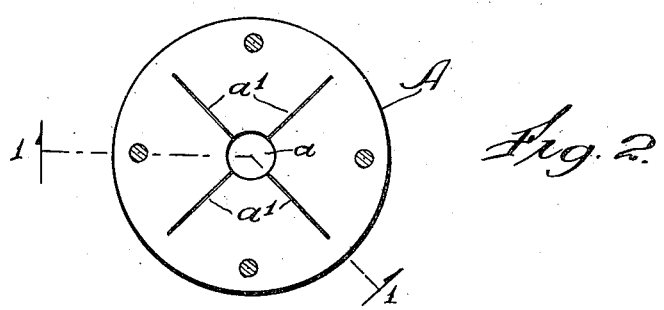

Fig. 2 a plan view of one of plates or disks of which a pile bound together are seen in Fig. 1.

Heretofore, so far as I am aware, it has been impossible by any known method to permanently mix a paint oil and water or a paint oil and any other diluent of different specific gravity and not adapted to produce a chemical union with the oil, or to produce a permanently mixed paint in which there is such diluent, except by the use of chemicals which cause some sort of molecular action to take place, such as the saponification, or the like; and in consequence all mixed paints in which there is employed any diluent of different specific gravity from the paint oil, become separated after standing for a longer or shorter time, and must be repeatedly stirred or shaken together in order to be in condition for use. By the present invention I am able to produce a permanent mixture, without chemical action, of a paint oil and water or a paint oil and other diluent or liquid component, such as skim milk; and the paint oil mixture comprising paint oil and such diluent or other component, or the paint having added to such paint oil mixture a suitable body material and pigment, remains permanently mixed ready for use for any extended length of time.

To produce this improved paint or paint oil mixture as a basis for paint, a paint oil such as linseed oil, or other oil suitable for paint, is mixed with the desired quantity of water, or other diluent, the two liquids being stirred or shaken together in any suitable manner, and the mixture is then forced by a heavy pressure, usually from five hundred pounds to three thousand pounds to the square inch, through a medium which is impermeable to said mixture under less pressure, causing the molecules of the two elements to be mechanically forced into such intimate relation as to become inseparable except by chemical action or heat causing evaporation of one or the other. The apparatus suitable for thus mechanically blending the paint oil and diluent is illustrated in the drawing, consisting of a pile of disks, A, whose surfaces are flat and ground to fit as absolutely as metal can be made to fit to metal, each plate having a central aperture, $a$, and any desired number of capillary grooves, $a^1$, extending out form such aperture toward the circumference but not reaching the circumference of the plate. These plates are assembled in a pile, but as firmly together as possible, their central apertures coinciding to form a conduit through them to a bottom plate, $a^2$, which is not apertured. The mixture is introduced into this central aperture of the pile under pressure by any convenient means, as by a pipe, C, through which the liquid is forced under the desired pressure,—preferably hydraulic pressure being employed. The pile of plates is most conveniently positioned within an exterior casing or receptacle, B, in which the permanent mixture which results from forcing the temporarily mixed liquids through the joints between the plates,—as close as metal joints can be made, and which would be impermeable to the mixture except under the extreme pressure mentioned,—is received and accumulated as it emerges at the circumference of all the plates from between their faces. The resulting permanent mixture may properly be termed "homogeneous" as distinguished from merely uniform; and the process of producing this permanent mixture or emulsion may be described as the process of homogenizing the mixture.

In practice I take a suitable paint oil,— preferably linseed oil,—and water, in the proportion of about 25% of oil to 75% of water, and these two liquids being thoroughly stirred together, are forced through the homogenizer as above described. Any desired amount of any suitable body material may be now suitably mixed with the homogenized liquid and the mixture will be permanent. Furthermore, this mixture may be further diluted by the addition of water or other diluent by the usual process of stirring the diluent into the mixture, and when thus diluted the mixture is equally permanent as the undiluted mixture which issues from the homogenizer, the homogenized liquid having apparently the capacity of absorbing the added water or other diluent.

I have found that the most desirable paint product which can be produced by this process results from employing skim milk as the diluent, either in whole or in part. The skim milk is in that case mixed with the paint oil by stirring in the first instance and the mixture passed through the homogenizer, the desired body material and additional pigment being added, and any additional amount of water added and mixed in the usual manner by stirring or shaking.

I claim:—

1. The process of making paint, consisting, first, in making a mixture of the paint oil and a diluent; second, homogenizing said mixture by forcing it under pressure exceeding five hundred pounds to the square inch, through a medium which is impermeable to it under less pressure, mixing the homogeneous resulting liquid with a body material.

2. The process of making paint, which consists in first, making a mixture of paint oil and a diluent; second, homogenizing said mixture by forcing it under pressure exceeding five hundred pounds to the square inch through a medium which is impermeable to it under less pressure; third, mixing the homogenized resulting liquid with a body material and an additional diluent liquid.

3. The process of making paint which consists in, first, making a mixture of a paint oil and a diluent; second, homogenizing said mixture by forcing it under pressure exceeding five hundred pounds to the square inch through a medium which is impermeable to it under less pressure; third, mixing the homogeneous resulting liquid with a body material and skim milk.

4. The process of making paint which consists in, first, making a mixture of a paint oil and skim milk; second, homogenizing said mixture by forcing it under pressure exceeding five hundred pounds to the square inch through a medium which is impermeable to it under less pressure; third, mixing the homogeneous resulting liquid with a body material, a pigment and an additional diluent.

5. For the purpose of making paint, a permanent emulsion of a paint oil and a diluent liquid of different specific gravity, and not making chemical union with the paint oil.

6. A paint consisting of a permanent emulsion of a paint oil and a diluent liquid and having intermixed therewith a body material.

In testimony whereof, I have hereunto set my hand at Chicago, Illinois, this 11th day of August, 1916.

WALTER A. WEST.